United States Patent
Bernhardt et al.

(10) Patent No.: US 11,142,090 B2
(45) Date of Patent: Oct. 12, 2021

(54) DEVICE AND METHOD FOR OPERATING A MOTOR VEHICLE, AND MOTOR VEHICLE

(71) Applicant: Robert Bosch GmbH, Stuttgart (DE)

(72) Inventors: Christian Bernhardt, Stuttgart (DE); Thomas Meyer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 16/488,757

(22) PCT Filed: Feb. 8, 2018

(86) PCT No.: PCT/EP2018/053117
§ 371 (c)(1),
(2) Date: Aug. 26, 2019

(87) PCT Pub. No.: WO2018/153679
PCT Pub. Date: Aug. 30, 2018

(65) Prior Publication Data
US 2021/0138930 A1    May 13, 2021

(30) Foreign Application Priority Data
Feb. 27, 2017    (DE) .................... 10 2017 203 147.6

(51) Int. Cl.
*B60L 58/20*    (2019.01)
*H02J 1/08*    (2006.01)
*B60L 1/00*    (2006.01)

(52) U.S. Cl.
CPC ............. *B60L 58/20* (2019.02); *B60L 1/00* (2013.01); *H02J 1/082* (2020.01); *B60L 2210/10* (2013.01); *H02J 2310/48* (2020.01)

(58) Field of Classification Search
None
See application file for complete search history.

(56) References Cited

U.S. PATENT DOCUMENTS

| 2012/0083940 A1* | 4/2012 | Mori | ................. H01M 8/04559 |
| | | | 700/298 |
| 2016/0144725 A1 | 5/2016 | Nozawa | |
| 2016/0214493 A1* | 7/2016 | Herke | ..................... B60L 53/14 |

FOREIGN PATENT DOCUMENTS

| EP | 3025897 | 6/2016 |
| JP | 2012115056 | 6/2012 |

OTHER PUBLICATIONS

International Search Report for Application No. PCT/EP2018/053117 dated May 9, 2018 (English Translation, 2 pages).

* cited by examiner

*Primary Examiner* — Jared Fureman
*Assistant Examiner* — Aqeel H Bukhari
(74) *Attorney, Agent, or Firm* — Michael Best & Friedrich LLP

(57) ABSTRACT

The invention relates to a device (1) for operating a motor vehicle, comprising an electrical drive system with an electrical high-voltage traction network (2) and an operating network (3) that has a high-voltage unit (7) comprising a power electronics system (5), and a low-voltage unit (6) comprising a control electronics system (4), and a first transformer (8) designed to convert an input voltage (U1) from the low-voltage unit (6) into a first, particularly higher output voltage (U2) for the power electronics system (5). According to the invention, the device comprises at least one second transformer (11) designed to convert the first output voltage (U2) of the first transformer (8) into a second output voltage (U3) for the control electronics system (4), the second output voltage (U3) being higher than the input voltage (U1).

10 Claims, 4 Drawing Sheets

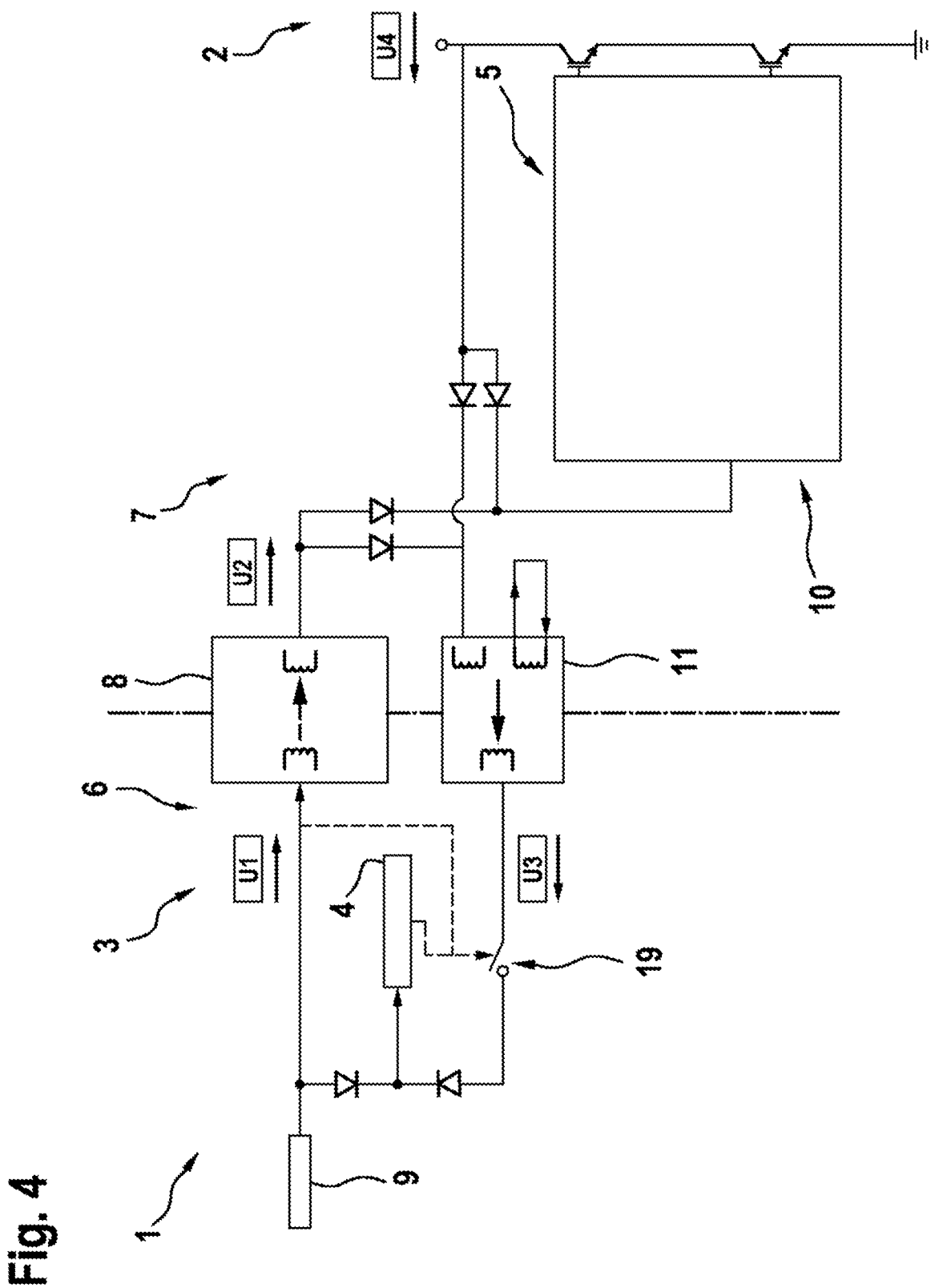

DEVICE AND METHOD FOR OPERATING A MOTOR VEHICLE, AND MOTOR VEHICLE

BACKGROUND OF THE INVENTION

The invention relates to a device for operating a motor vehicle, comprising an electrical drive system with an electrical high-voltage traction network as well as an operating network, which comprises a high-voltage part having a power electronics system and a low-voltage part having a control electronics system, and having at least one first transformer configured to convert an input voltage from the operating network into a first, in particular higher, output voltage for the power electronics system.

Furthermore, the invention relates to a motor vehicle with such a device and a method for operating the motor vehicle described above, wherein an input voltage from the low-voltage part is converted into a first, in particular higher, output voltage for the power electronics system by means of a transformer.

Devices, methods, and motor vehicles of the type mentioned initially are already known from the prior art.

In addition to the operating network, which substantially corresponds to the conventional on-board network and that is used to supply simple electronic components such as, for example, the interior lighting, an entertainment system, or the like, present-day motor vehicles also have a traction network that is used to supply an electrical drive system with energy. Since an electrical drive system compared to the other electrical/electronic components of a vehicle, which have hitherto been supplied by the on-board network, has a higher electrical voltage level, the two networks, i.e. the traction network and the operating network, must be galvanically separated from one another. In addition, it is known to separate the operating network into a low-voltage part and a high-voltage part. The low-voltage part usually has a control electronics system, which, for example, takes over also the control and monitoring of the traction network. The high-voltage part usually comprises a power electronics system, which can operate at a high operating voltage, which corresponds to that of the traction network. The power electronics system is in this case, for example, part of the traction network or serves to operate other components of the motor vehicle, which require an increased voltage level, such as for example a high-power air-conditioning system or the like.

In order to ensure safe operation of the motor vehicle, usually both the operating network and also the traction network have their own energy storage device. The energy storage device of the operating network in this case has a lower output voltage than the energy storage device of the high-voltage part or the traction network. In normal operation the motor vehicle is started by firstly putting into operation the operating network, in order to perform diagnostics functions before the traction network is also put into operation.

It is known to feed the power electronics system via the control electronics system solely from the operating network. To this end, at least one transformer/transducer is inserted between low-voltage part and high-voltage part, which galvanically separates the two parts from one another. The power electronics system is then in particular connected to the traction network only for sensor and control purposes. The problem here is that if the operating network is lost or disturbed, the control electronics system is not or is only partially supplied by the high-voltage part. It is only possible to supply the control part from the high-voltage part for a short time and only for specific parts of the control part. As a result, complex controls and regulating systems are required, Furthermore, a fluctuating supply voltage from the low-voltage part should be feared, in which case voltage dips, ISO pulses, EMV emissions and immissions, etc. must be taken into account and overcome by technical countermeasures in order to ensure a defect-free operation of the motor vehicle despite these effects.

SUMMARY OF THE INVENTION

The device according to the invention has the advantage that the aforesaid problems are overcome and safe operation of the motor vehicle is ensured. This is achieved according to the invention, whereby the device comprises at least one second transformer, configured to convert the output voltage of the first transformer into a second output voltage for the power electronics system, wherein the second output voltage is higher than the input voltage of the first transformer. The power electronics system is initially supplied via the first transformer or starting transducer and electrical power to supply the control electronics is transmitted by the second transformer with the aid of the second output voltage. Thus, the control part is only supplied via the second transducer and no longer from the operating network. As a result, critical voltage fluctuations in particular in the control electronics of the operating network have no effects and the operating safety of the motor vehicle is increased.

It is further provided that the device has a diagnostic unit, which is connected to a switching device, by means of which the traction network can be electrically connected to the high-voltage part. The diagnostic unit serves in particular to monitor the function of the power electronics system and/or the control electronics system as well as the traction network. After the initial start-up, the diagnostic unit initially checks the functional capability of the essential components, in particular of the operating system. If the diagnosis reveals that none or at least no critical errors are present, the switching device is actuated. In this case, the traction network is electrically connected to the high-voltage part. Thus, the energy provided from the high-voltage energy storage device is also available to the high-voltage part, in particular to the second transformer. Thus, the power electronics system can now be completely supplied with energy from the traction network. By this means, voltage dips and undesirable EMV emissions and the like can be avoided.

It is further preferably provided that a first diode arrangement is provided, which is configured in such a manner that the power electronics system is supplied either by the traction network or by the operating network or the low-voltage part depending on the operating voltage of the traction network and the output voltage of the first transformer. As a result of the diode arrangement, an automatic switching of the supply voltage for the power electronics system is thus provided. An active switching or an active control/regulation is not necessary, with the result that a particularly simple and cost-effective output of the device is ensured.

It is further preferably provided that the output voltage of the first transformer is lower than the lowest predicted operating voltage of the traction network. Thus, automatic switching to the traction network takes place as soon as this is connected by the actuation of the switching device.

It is further preferably provided that a second diode arrangement is provided, which is configured in such a manner that the control electronics system is supplied either by the operating network or by the second transformer depending on the operating voltage of the low-voltage part and the output voltage of the second transformer. Here also it is ensured by a switch-free configuration that an automatic switching between the operating voltage of the low-voltage part and the output voltage of the second transformer takes place automatically and a stable supply of the control electronics system is ensured.

It is further preferably provided that the output voltage of the second transformer is higher than the highest predicted operating voltage of the low-voltage part. As a result, the automatic switching is ensured in a simple manner.

It is further preferably provided that a boost converter is connected upstream of the power electronics system and the first transformer. The control electronics system is thus supplied by the boost converter during the start-up. The boost converter is switched off as soon as the traction network is additionally switched on. The voltage provided by the boost converter then drops below the level of the output voltage of the second transformer so that in particular, the automated switching process takes place reliably due to the advantageous diode arrangement in the control part. Switching off the boost converter can be accomplished via a software diagnosis or via a hardware circuit. For example, it is provided that the operating current is measured at the input of the transformer, wherein the boost converter is switched on depending on the operating current.

It is further preferably provided that a switching device is interposed between the control electronics system and the second transformer. By means of the switching device, preferably during the start-up process the output of the second transformer is separated from the control electronics so that during start-up the electrical supply of the control electronics system is further achieved by means of the operating voltage of the low-voltage part. Only after diagnosis and testing of the power electronics system has been completed and the traction network has been additionally switched on, is the switching device actuated in order to connect the second transformer with the control electronics. Here also the position of the switch or the state of the switching device can be accomplished as described previously, by means of a software diagnosis or a hardware circuit, in particular a current sensor at the input of the first transformer. It is thereby ensured that after additionally switching on the traction network, the control electronics system and the power electronics system are only supplied from this.

The motor vehicle is characterized by the device according to the invention.

Advantages already mentioned are obtained as a result.

The method according to the invention, by means of which in particular the above-described motor vehicle is operated is characterized in that the output voltage of the first transformer is converted by means of a second transformer into a second output voltage for the control electronics system, wherein the second voltage is selected to be higher than the input voltage of the first transformer. The advantages already mentioned are obtained as a result.

Further advantages and preferred features and feature combinations are obtained in particular from that described previously and from the claims.

BRIEF DESCRIPTION OF THE DRAWINGS

The invention will be described in detail hereinafter with reference to the drawings. To this end, in the figures:

FIG. 4 shows a fourth exemplary embodiment of the device, in each case as a simplified circuit diagram.

DETAILED DESCRIPTION

Figure 1:
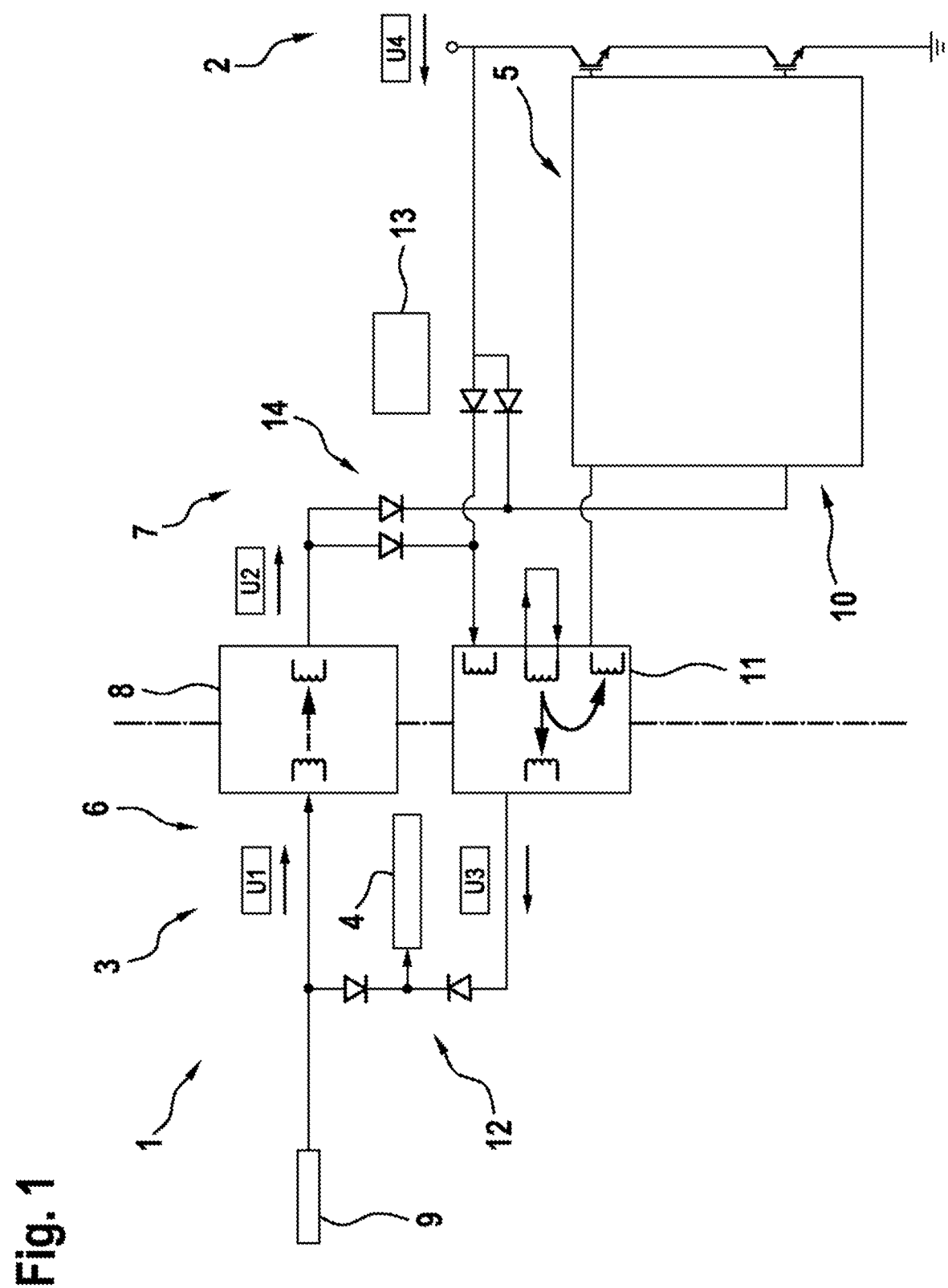
FIG. 1 shows a first exemplary embodiment of an advantageous device for operating a motor vehicle.

FIG. 1 shows in a simplified circuit diagram an advantageous device 1 for operating a motor vehicle not shown here in detail, which has an electrical drive system. The drive system comprises a high-voltage traction network 2, which in particular comprise an electrical drive machine and a high-voltage energy storage device. Furthermore, the drive system comprises an operating network 3, which is similar to the conventional on-board network of a motor vehicle and has a control electronics system 4 and a power electronics system 5. In this case, the control electronics system 4 is arranged in a low-voltage part 6 and the power electronics system 5 is arranged in a high-voltage part 7 of the operating network 3, wherein the low-voltage part 6 and the high-voltage part 7 are connected to one another by a transducer or transformer 8 and are otherwise galvanically separated from one another. The operating network 3 also has an electrical storage device 9, which is arranged in the low-voltage part 6 and provides the operating voltage U1 for the operating network 3. The transformer 8 thus receives the operating voltage U1 as input voltage and converts this into an output voltage U2. The power electronics system 5 of the high-voltage part 7 is supplied by the output voltage U2, wherein the power electronics system 5 is operated by a suitable control/regulation system 10—not shown in detail here.

During the start-up process a second transformer 11 is also supplied by means of the output voltage U2. From this the electrical energy to supply the control electronics system 4 is transmitted with the aid of an output voltage U3. The transformer 11 is in this case configured in such a manner that the voltage U3 is always greater than the voltage U1. A diode circuit 12 is located upstream of the control device 4, which ensures that the control electronics 4 is supplied or operated during the start-up process by the operating voltage U1 and in all operating states only by the output voltage U3.

The drive system further comprises a diagnostic device 13, which is shown only in simplified manner in FIG. 1. During the start-up, tests/diagnoses are carried out by means of the diagnostic device, by means of which in particular the power part or the power electronics system 5 is monitored. The diagnostic unit 13 is in this case connected to a switching device (not shown in FIG. 1), by means of which the traction network 2 can be connected to the high-voltage part 7. The traction network 2 in this case has a voltage U4, which corresponds for example to the operating voltage or output voltage of the high-voltage energy storage device.

When the diagnostic unit 13 has completed its tests and has identified the functional capability of the power part 5, it actuates the switching device in order to switch on the traction network 2 and in particular connect to the transformer 11. As a result of the configuration of the device 1, it is ensured that the operating voltage U4 is always greater than the output voltage U2. As a result of a further diode arrangement 14, which is located upstream of the transformer 11, it is ensured that this is always operated at the higher of the two voltages of U2 and U4. It is thus ensured that after additionally switching on the traction network 2, the control electronics system 4 and the power electronics system 5 are only supplied from this. In particular, the transformers 8 and 11 and the wiring thereof in the device 1 form a device, which ensures a safe operation of the motor vehicle.

Figure 2:
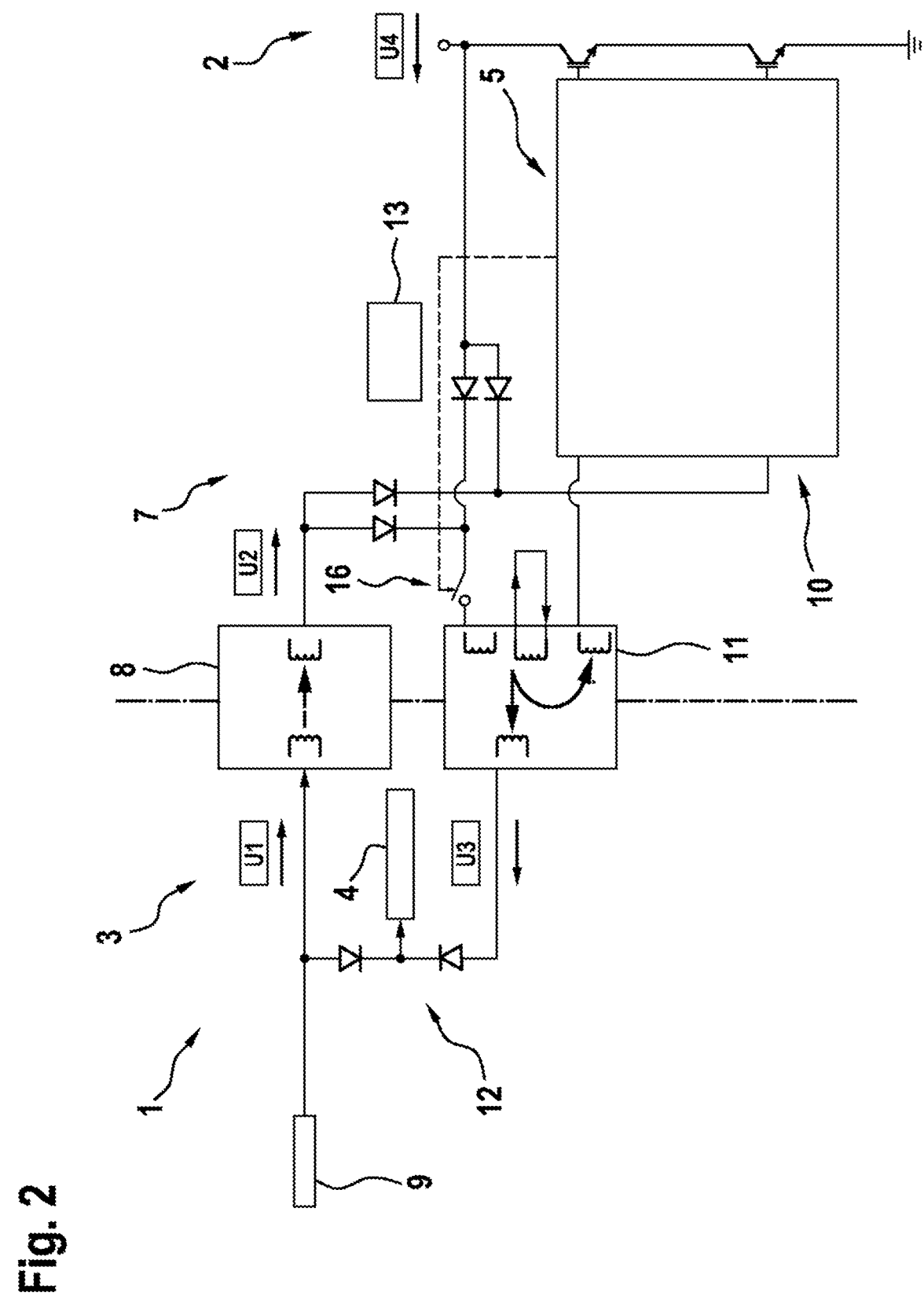
FIG. 2 shows a second exemplary embodiment of the device.

FIG. 2 shows a second exemplary embodiment, which differs from the first exemplary embodiment in that a switching device 16 is located upstream of the transformer 11, by means of which the traction network 4 can be additionally switched on or can be separated from the transformer 11.

During the start-up process, the voltage U1 from the low-voltage part is applied to the transformer 8, which produces the voltage U2 therefrom. All the tests and diagnoses are carried out with the aid of this output voltage U2. After the diagnoses and tests of the power electronics system 5 have been successfully completed, the traction network 2 is additionally switched on with the voltage U4. If this is ensured, normal operation of the power electronics system 5 can be started. In this case, by means of the advantageous configuration it is ensured that the voltage U4 is always greater than the output voltage U2. As soon as the voltage U4 or the traction network 2 is additionally switched on, the power electronics system 5 can additionally switch on the transformer 11, which produces the voltage U3, and thus supplies the control electronics system 4. In this case, it should also be ensured that the output voltage U3 is greater than the input voltage U1.

Figure 3:
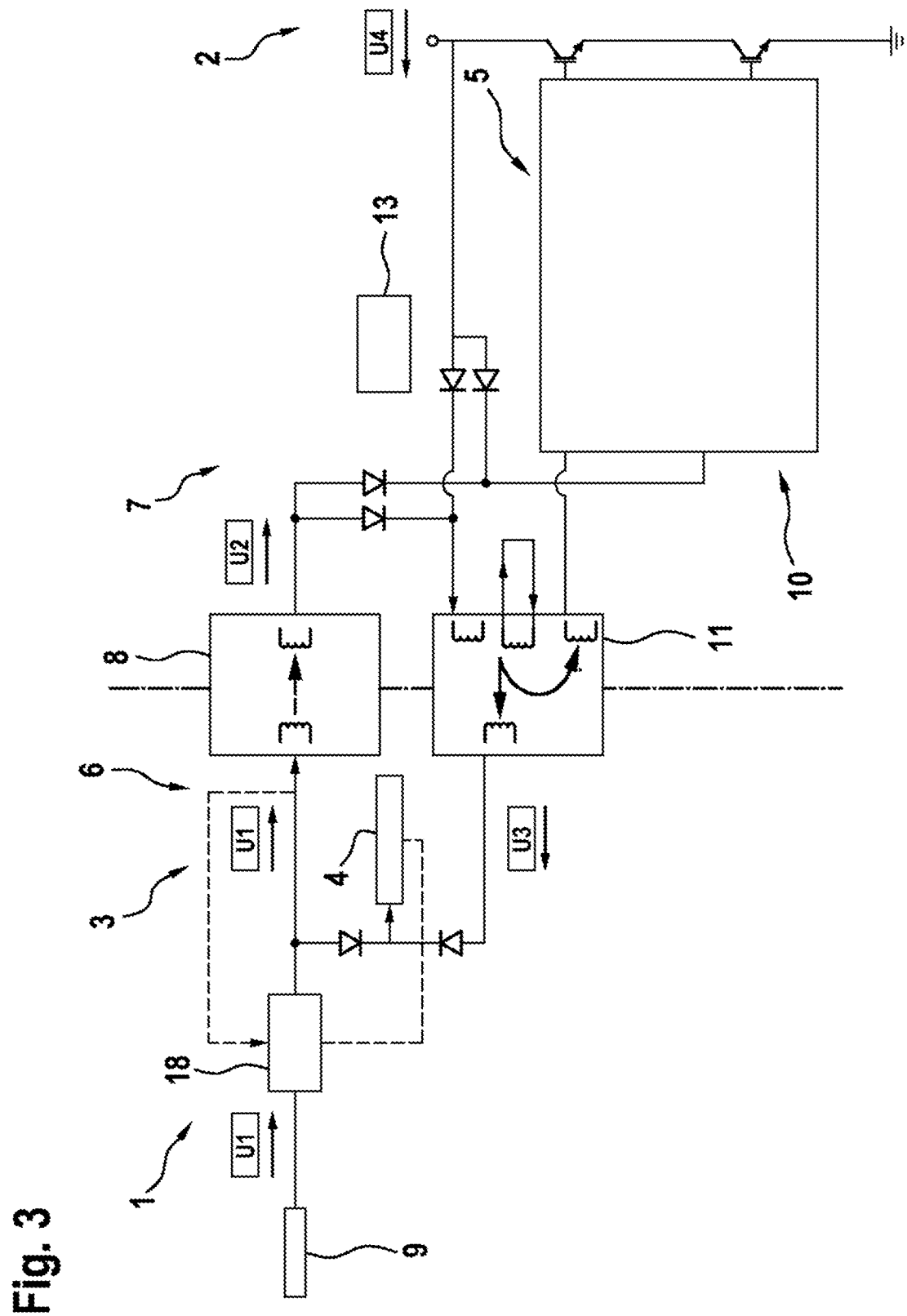
FIG. 3 shows a third exemplary embodiment of the device.

FIG. 3 shows a third exemplary embodiment, which differs from the first exemplary embodiment in that a boost converter 18 is connected upstream of the transformer 8 and the control electronics system 4. This variant can also be used in the second exemplary embodiment. The control electronics system is supplied via the boost converter 18 during start-up, which produces an operating voltage U1' from the operating voltage U1 coming from the low-voltage part 6. The voltage U1' is applied to the start transducer or transformer 8 during the start-up process, which generates the voltage U2 therefrom, which supplies the power electronics system 5. During the start-up process the transformer 11 is also supplied with the transmitted power from the start transducer. This generates the voltage U3, which is less than the operating voltage U1'.

After the diagnoses and tests of the power electronics system 5 have been successfully completed, the traction network 2 is additionally switched on with the voltage U4. As soon as this is accomplished, the boost converter 18 is switched off. In this case, the voltage U1' drops back to the level of the voltage U1, so that the input voltage for the control electronics system 4 and the transformer 8 lie reliably below the voltage U3. This has the result that by means of the diode circuit 12, it is ensured that the control electronics system 4 is operated by the operating voltage U3. This switch-off of the boost converter 18 can be accomplished via a software diagnosis or via a hardware circuit, which for example has a current measuring sensor at the input of the transformer 8. It can thus be ensured that after additionally switching on the traction network 2, the control electronics system 4 and the power electronics system 5 are supplied only from this network.

FIG. 4 shows a fourth exemplary embodiment, which differs from the preceding exemplary embodiments in particular in that an actuatable switch is interposed between the control electronics system 4 and the transformer 11. This can also be used in a configuration of the device according to one of exemplary embodiments 1 or 4 with two transducers. The voltage U1 from the low-voltage part 6 is applied to the starting transducer or the transformer 8 during the start-up process. This produces therefrom the first voltage U2, which supplies the power electronics system 5. During the start-up process the transformer 11 is supplied with the transmitted power via the start-up transducer. From this the electrical power to supply the control electronics system 4 is transmitted with the aid of the output voltage U3. However, during the start-up process in the present case the voltage U3 is separated from the control electronics system 4 by means of the switch 19 so that during the start-up the control electronics system 4 is still supplied by the operating voltage U1. After the diagnoses and tests of the power electronics system 5 have been successfully completed, the traction network 2 is additionally switched on as previously with the voltage U4. The switch 19 is then closed so that as a result of the diode circuit 12 the control electronics system 4 is then supplied by the operating voltage U3. Here also U3 is expediently selected to be greater than the voltage U1. The position of the switch 19 is preferably predefined by means of a software diagnosis or via a hardware circuit, which for example comprises the aforesaid current measuring sensor. It is thereby ensured that after application of the voltage U4 or after additionally switching on the traction network 2, the control electronics system 4 and the power electronics system 5 are only supplied from this.

The invention claimed is:

1. A device (1) for operating a motor vehicle, the device comprising:
   an electrical drive system having an electrical high-voltage traction network (2) and an operating network (3), the operating network (3) including
      a high-voltage part (7) having a power electronics system (5),
      a low-voltage part (6) having a control electronics system (4), and
      a first transformer (8) configured to convert an input voltage (U1) from the low-voltage part (6) into a first output voltage (U2) for the power electronics system (5), wherein the first output voltage (U2) is greater than the input voltage (U1), and
   at least one second transformer (11) configured to convert the first output voltage (U2) of the first transformer (8) into a second output voltage (U3) for the control electronics system (4), wherein the second output voltage (U3) is higher than the input voltage (U1).

2. The device as claimed in claim 1, the device including a diagnostic unit (13), configured to monitor the operation of the operating network (3), wherein the diagnostic unit (13) is connected to a switching device, by means of which the traction network can be electrically connected to the high-voltage part (7).

3. The device as claimed in claim 1, further comprising a first diode arrangement (14), which is configured in such a manner that the power electronics system (5) is supplied either by the traction network (2) or by the operating network (3) depending on an operating voltage (U4) of the traction network (2) and the output voltage (U2) of the first transformer (8).

4. The device as claimed in claim 3, wherein the output voltage (U2) of the first transformer (8) is lower than a lowest predicted operating voltage (U4) of the traction network (2).

5. The device as claimed in claim 3, further comprising a second diode arrangement (12), which is configured in such a manner that the control electronics system (4) is supplied either by the low-voltage part (6) or by the second transformer (11) depending on the operating voltage (U1) of the low-voltage part (6) and the output voltage (U3) of the second transformer (11).

6. The device as claimed in claim 1, wherein the output voltage (U3) of the second transformer (11) is higher than the highest predicted operating voltage of the low-voltage part (6).

7. The device as claimed in claim 1, wherein a boost converter (18) is connected upstream of the power electronics system (4) and the first transformer (8).

8. The device as claimed in claim 1, wherein an actuatable switch (19) is interposed between the control electronics system (4) and the second transformer (11).

9. A motor vehicle comprising an electrical drive system with an electrical high-voltage traction network (2) and an operating network (3) which has a high-voltage part (7) having a power electronics system (5) and a low-voltage part (6) having a control electronics system (4), and a first transformer (8) configured to convert an input voltage (U1) from the low-voltage part (6) into a first output voltage (U2) for the power electronics system (5), wherein the first output voltage (U2) is greater than the input voltage (U1), and at least one second transformer (11) configured to convert the first output voltage (U2) of the first transformer (8) into a second output voltage (U3) for the control electronics system (4), wherein the second output voltage (U3) is higher than the input voltage (U1).

10. A method for operating a motor vehicle comprising an electrical drive system with an electrical high-voltage traction network (2) as well as an operating network (3) which has a high-voltage part (7) having a power electronics system (5) and a low-voltage part (6) having a control electronics system (4), wherein an input voltage (U1) from the low-voltage part is converted by a first transformer (8) into a higher output voltage (U2) for the power electronics system (5), wherein the output voltage (U2) of the first transformer (8) is converted into a second output voltage (U3) for the control electronics system (4), wherein the second output voltage (U3) is selected to be higher than the input voltage (U1).

* * * * *